United States Patent
Silver et al.

(10) Patent No.: US 11,860,631 B2
(45) Date of Patent: *Jan. 2, 2024

(54) DETECTING AND RESPONDING TO PROCESSIONS FOR AUTONOMOUS VEHICLES

(71) Applicant: Waymo LLC, Mountain View, CA (US)

(72) Inventors: David Harrison Silver, San Carlos, CA (US); Qichi Yang, Foster City, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,182

(22) Filed: Nov. 21, 2022

(65) Prior Publication Data

US 2023/0141636 A1 May 11, 2023

Related U.S. Application Data

(63) Continuation of application No. 16/993,672, filed on Aug. 14, 2020, now Pat. No. 11,537,128, which is a (Continued)

(51) Int. Cl.
*G05D 1/00* (2006.01)
*B60W 30/18* (2012.01)
*G06V 20/58* (2022.01)

(52) U.S. Cl.
CPC ..... *G05D 1/0088* (2013.01); *B60W 30/18009* (2013.01); *G06V 20/584* (2022.01);
(Continued)

(58) Field of Classification Search
CPC ........ G05D 1/0088; G05D 2201/0213; B60W 30/18009; B60W 2554/804;
(Continued)

(56) References Cited

U.S. PATENT DOCUMENTS 8,195,394 B1 6/2012 Zhu et al.
8,977,420 B2 3/2015 Deng et al.
(Continued)

FOREIGN PATENT DOCUMENTS

JP 2013196601 A 9/2013
JP 2017138694 A 8/2017
(Continued)

OTHER PUBLICATIONS

International Search Report and Written Opinion for Application No. PCTUS2019046141 dated Dec. 3, 2019.
(Continued)

*Primary Examiner* — Mahmoud S Ismail
(74) *Attorney, Agent, or Firm* — Botos Churchill IP Law

(57) ABSTRACT

The technology relates to detecting and responding to processions. For instance, sensor data identifying two or more objects in an environment of a vehicle may be received. The two or more objects may be determined to be disobeying a predetermined rule in a same way. Based on the determination that the two or more objects are disobeying a predetermined rule, that the two or more objects are involved in a procession may be determined. The vehicle may then be controlled autonomously in order to respond to the procession based on the determination that the two or more objects are involved in a procession.

20 Claims, 9 Drawing Sheets

Related U.S. Application Data continuation of application No. 16/105,233, filed on Aug. 20, 2018, now Pat. No. 10,795,362.

(52) U.S. Cl.
CPC ... *B60W 2554/804* (2020.02); *B60W 2555/60* (2020.02); *G05D 2201/0213* (2013.01)

(58) Field of Classification Search
CPC ......... B60W 2555/60; B60W 60/0017; B60W 30/08; B60W 30/14; B60W 30/18154; B60W 40/02; G06V 20/584; G06V 20/56; G08G 1/00; B60R 21/0134; B60Y 2300/08; B60Y 2300/14
USPC .......................................................... 701/23
See application file for complete search history.

(56) References Cited

U.S. PATENT DOCUMENTS

| | | | |
|---|---|---|---|
| 9,600,768 B1* | 3/2017 | Ferguson | G06N 5/02 |
| 9,633,560 B1 | 4/2017 | Gao et al. | |
| 10,192,442 B2 | 1/2019 | Ferguson | |
| 2012/0083960 A1 | 4/2012 | Zhu et al. | |
| 2013/0093895 A1 | 4/2013 | Palmer et al. | |
| 2015/0022378 A1 | 1/2015 | Hahne et al. | |
| 2015/0262481 A1 | 9/2015 | Selin | |
| 2016/0144867 A1 | 5/2016 | Delp et al. | |
| 2017/0088040 A1 | 3/2017 | Williams et al. | |
| 2017/0110011 A1 | 4/2017 | Tonguz et al. | |
| 2017/0249836 A1 | 8/2017 | Laur et al. | |
| 2017/0329332 A1 | 11/2017 | Pilarski et al. | |
| 2018/0233047 A1 | 8/2018 | Mandeville-Clarke | |
| 2019/0129432 A1 | 5/2019 | Russell et al. | |
| 2019/0152490 A1 | 5/2019 | Lan et al. | |
| 2019/0225142 A1 | 7/2019 | Switkes | |
| 2019/0258253 A1 | 8/2019 | Tremblay | |
| 2020/0265714 A1* | 8/2020 | Alon | G07C 5/0866 |
| 2021/0042531 A1* | 2/2021 | Zhang | G06T 7/70 |

FOREIGN PATENT DOCUMENTS

| | | |
|---|---|---|
| KR | 101029096 B1 | 4/2011 |
| WO | 2017056995 A1 | 4/2017 |
| WO | 2018147871 A1 | 8/2018 |

OTHER PUBLICATIONS

Notice of Reasons for Rejection for Japanese Patent Application No. 2021-507573, dated Mar. 31, 2022.
The Extended European Search Report for European Patent Application No. 19851450.7, dated Mar. 17, 2022.
Prakken, Henry, "On the Problem of Making Autonomous Vehicles Confirm to Traffic Law", Artificial Intelligence and Law, vol. 25, No. 3, Sep. 2017, pp. 341-363.
Notice of Allowance for Korean Patent Application No. 10-2021-7007955, dated Feb. 27, 2023.

* cited by examiner

DETECTING AND RESPONDING TO PROCESSIONS FOR AUTONOMOUS VEHICLES

CROSS REFERENCE TO RELATED APPLICATIONS

The present application is a continuation of U.S. patent application Ser. No. 16/993,672, filed Aug. 14, 2020, which is a continuation of U.S. patent application Ser. No. 16/105,233, filed Aug. 20, 2018, issued as U.S. Pat. No. 10,795,362, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Robust operation of an autonomous vehicle or a vehicle operating in an autonomous driving mode requires proper response to unexpected circumstances, such as when a vehicle encounters a procession. Processions may include groups of vehicles or persons moving together, such as in a parade, march, funeral procession, motorcade, etc. While these are rare situations, they typically invoke completely different traffic rules, either legally or in terms of courtesy. Therefore being able to detect and respond to such processions can be especially important to ensuring a safe and effective autonomous driving.

BRIEF SUMMARY

Aspects of the disclosure provide a method of detecting and responding to processions. The method includes receiving, by one or more processors, sensor data identifying two or more objects in an environment of a vehicle; determining, by the one or more processors, that the two or more objects are disobeying a predetermined rule in a same way; based on the determination that the two or more objects are disobeying a predetermined rule, determining, by the one or more processors, that the two or more objects are involved in a procession; and controlling, by the one or more processors, the vehicle autonomously in order to respond to the procession based on the determination that the two or more objects are involved in a procession.

In one example, the predetermined rule defines a traffic precedence that the two or more objects are disobeying. In another example, determining that the two or more objects are involved in a procession is based on a threshold minimum number of objects determined to be disobeying the predetermined rule. In this example, determining that the two or more objects are involved in a procession is based on the threshold minimum number of objects disobeying the predetermined rule over at least a threshold minimum period of time. In another example, determining that the two or more objects are involved in a procession is based on objects determined to be disobeying the predetermined rule over at least a threshold minimum period of time. In another example, the method also includes determining that the procession is a motorcade or a funeral procession. In another example, the method also includes determining that the procession is a parade or march. In another example, the predetermined rule includes one of stopping for a red traffic light signal or stopping for a stop sign. In another example, determining, by the one or more processors, that the two or more objects are involved in the procession is further based on a number of additional objects each disobeying the predetermined rule. In another example, determining, by the one or more processors, that the two or more objects are involved in the procession is further based on an amount of time during which additional objects also disobey the predetermined rule. In another example, the method also includes identifying an emergency vehicle from the sensor data, and wherein determining that the two or more objects are involved in the procession is further based on the emergency vehicle. In this example, determining that the two or more objects are involved in the procession is further based on a location of the emergency vehicle relative to the two or more objects. In this example, determining that the two or more objects are involved in the procession is further based on whether the emergency vehicle is stopped in an intersection. In another example, the method also includes identifying a pedestrian directing traffic from the sensor data, and wherein determining that the two or more objects are involved in the procession is further based on the identified pedestrian directing traffic.

In another example, the method also includes identifying a pedestrian holding a flag, a sign, or a banner from the sensor data, and wherein determining that the two or more objects are involved in the procession is further based on the identified pedestrian holding the flag, the sign or the banner. In another example, the method also includes identifying that at least one of the two or more objects has a flag or badge, and wherein determining that the two or more objects are involved in the procession is further based on the identification that the at least one of the two or more objects has a flag or badge. In another example, the method also includes determining that an additional object between two of the two or more objects is not disobeying the predetermined rule, and wherein determining that the two or more objects are involved in the procession is further based on the determination that the additional object between two of the two or more objects is not disobeying the predetermined rule. In another example, the method also includes determining a gap in time between two of the two or more objects disobeying the predetermined rule in the same way, and wherein determining that the two or more objects are involved in the procession is further based on the gap in time. In another example, the method also includes determining that the two or more objects are involved in the procession is further based on local regulations for processions. In another example, the method also includes controlling the vehicle includes yielding to the two or more objects involved in the procession as a group.

DETAILED DESCRIPTION

Overview

Figure 1:
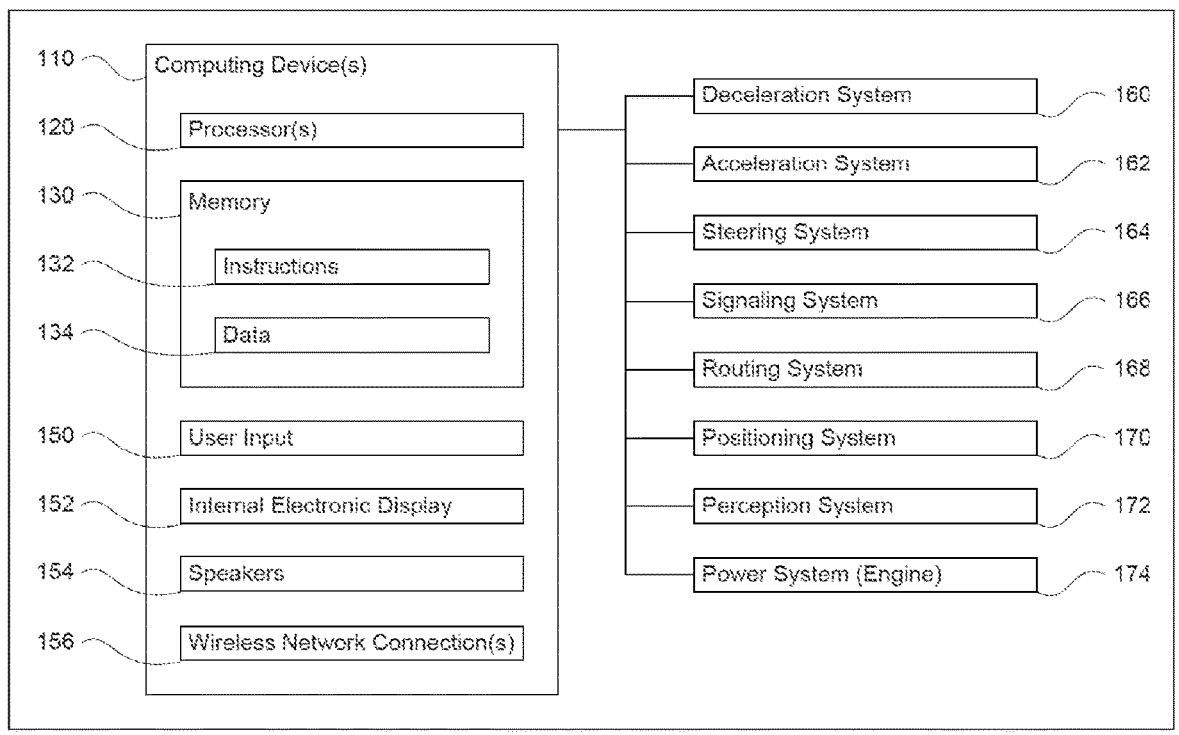
FIG. 1 is a functional diagram of an example vehicle in accordance with aspects of the disclosure.

The technology relates to detecting and responding to processions for fully autonomous vehicles or vehicles operating in an autonomous driving mode. Processions may include groups of vehicles or persons moving together, such as in a parade, march, funeral procession, motorcade, etc. While these are rare situations, they typically invoke completely different traffic rules, either legally or in terms of courtesy. Therefore being able to detect and respond to such processions can be especially important to ensuring a safe and effective autonomous driving.

The vehicle's perception system may use various sensors to detect and identify objects in the vehicle's surroundings. This information may be used to determine how to maneuver the vehicle based on a combination of this information, map data, as well as rules for responding to different situations.

In order to detect a procession, the sensor data from the perception system may be analyzed to determine whether any detected objects are disobeying one of the rules. Using this information, a procession detector may be used to detect whether the object is involved in a procession. In one instance, the detector may determine whether there is a procession based on whether one or more thresholds is met. In other instances, whether or not objects are involved in a procession may be more nuanced. For instance, each additional object are disobeying the same rule in the same way may increase a likelihood that the objects are involved in a procession. In addition or alternatively, for each additional second or more or less of time that objects continue to disobey the same rule in the same way may also increase a likelihood that the objects are involved in a procession.

Other signals may further increase or decrease the likelihood of a procession. For instance, visual signals, such as identifying an object may also increase the likelihood of a procession. If there are objects which do not appear to be disobeying the same rule in the same way, this may decrease or have no effect on the likelihood of a procession. Similarly, if there is a gap in time during which objects are obeying the rule, this may decrease the likelihood of a procession. In some instances, local regulations may be taken into account by the detector.

Once the likelihood meets a certain threshold, the detector may determine that there is a procession. Once the detector has determined that there is a procession, this information may be sent to the vehicle's planner and used in order to determine how to respond to the procession and therefore how to control the vehicle.

The features described herein may provide for a useful way to detect and respond to procession. By doing so, the vehicle can respond to the procession, for instance yielding appropriately. This may keep the vehicle becoming aggressive or assertive inappropriately as well as preventing an uncomfortable stoppage of traffic by not appropriately responding to processions.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing devices-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing devices code on the computing devices-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing devices, or memory may actually include multiple processors, computing devices, or memories that may or may not be stored within the same physical housing. As an example, internal electronic display 152 may be controlled by a dedicated computing devices having its own processor or central processing unit (CPU), memory, etc. which may interface with the computing devices 110 via a high-bandwidth or other network connection. In some examples, this computing devices may be a user interface computing devices which can communicate with a user's client device. Similarly, the memory may be a hard drive or other storage media located in a housing different from that of computing devices 110. Accordingly, references to a processor or computing devices will be understood to include references to a collection of processors or computing devices or memories that may or may not operate in parallel.

Computing devices 110 may all of the components normally used in connection with a computing devices such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), routing system 168 (for navigating the vehicle to a location or around objects), positioning system 170 (for determining the position of the vehicle), perception system 172 (for detecting objects in an external environment of the vehicle), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
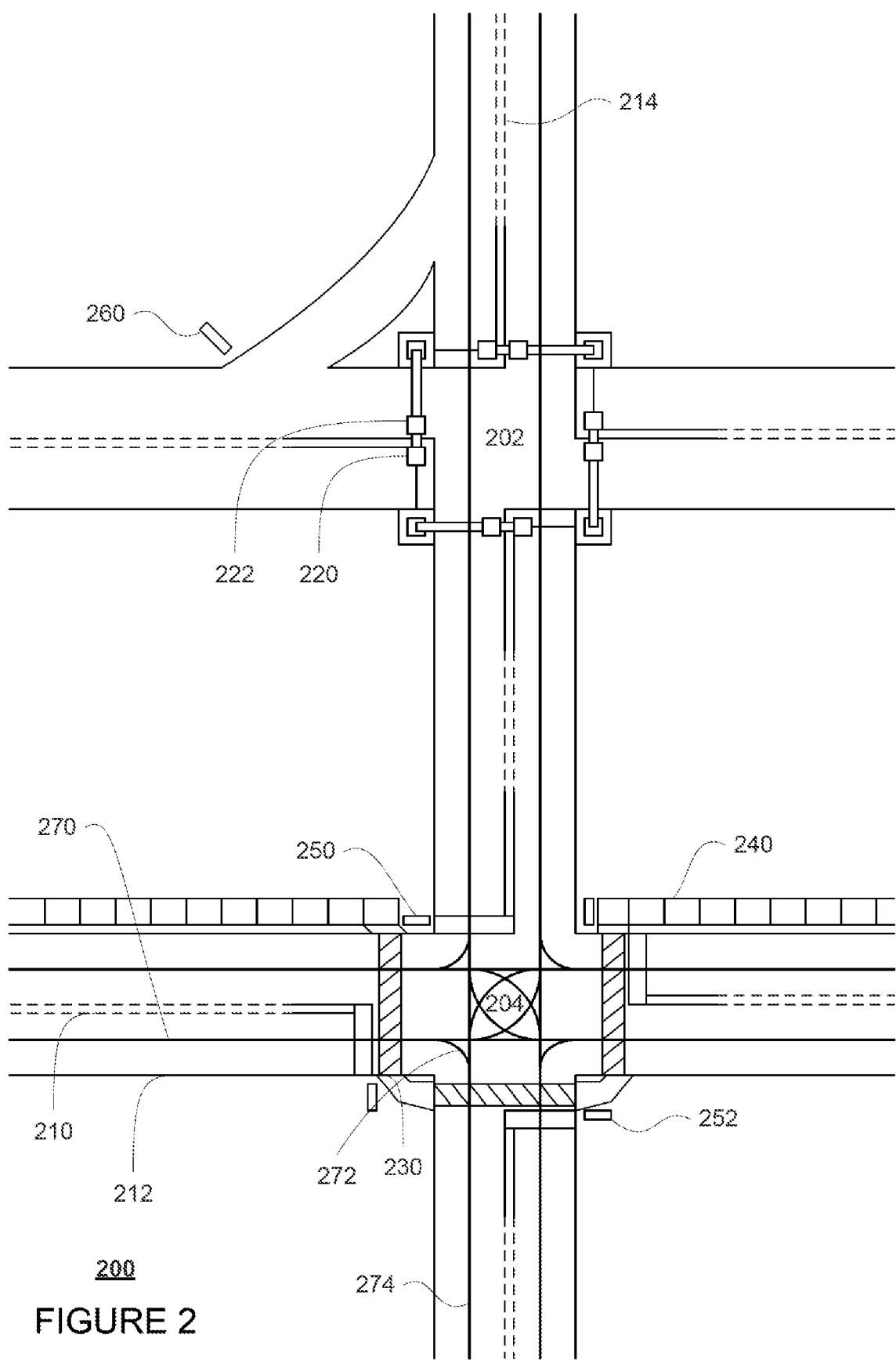
FIG. 2 is an example representation of detailed map information in accordance with aspects of the disclosure.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, intersections, crosswalks, speed limits, traffic light signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway including intersections 202 and 204. In this example, the map information 200 includes information identifying the shape, location, and other characteristics of lane lines 210, 212, 214, traffic light signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the detailed map information is depicted herein as an image-based map, the map information need not be entirely image based (for example, raster). For example, the detailed map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic light signals, signs, trees, etc. For example, the perception system 172 may include one or more LIDAR sensors, sonar devices, radar units, cameras and/or any other detection devices that record sensor data which may be processed by computing devices 110. The sensors of the perception system may detect objects and their characteristics such as location, orientation, size, shape, type (for instance, vehicle, person or pedestrian, bicyclist, etc.), heading, and speed of movement, etc. The raw data from the sensors and/or the aforementioned characteristics can be quantified or arranged into a descriptive function, vector, and or bounding box and sent as sensor data for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
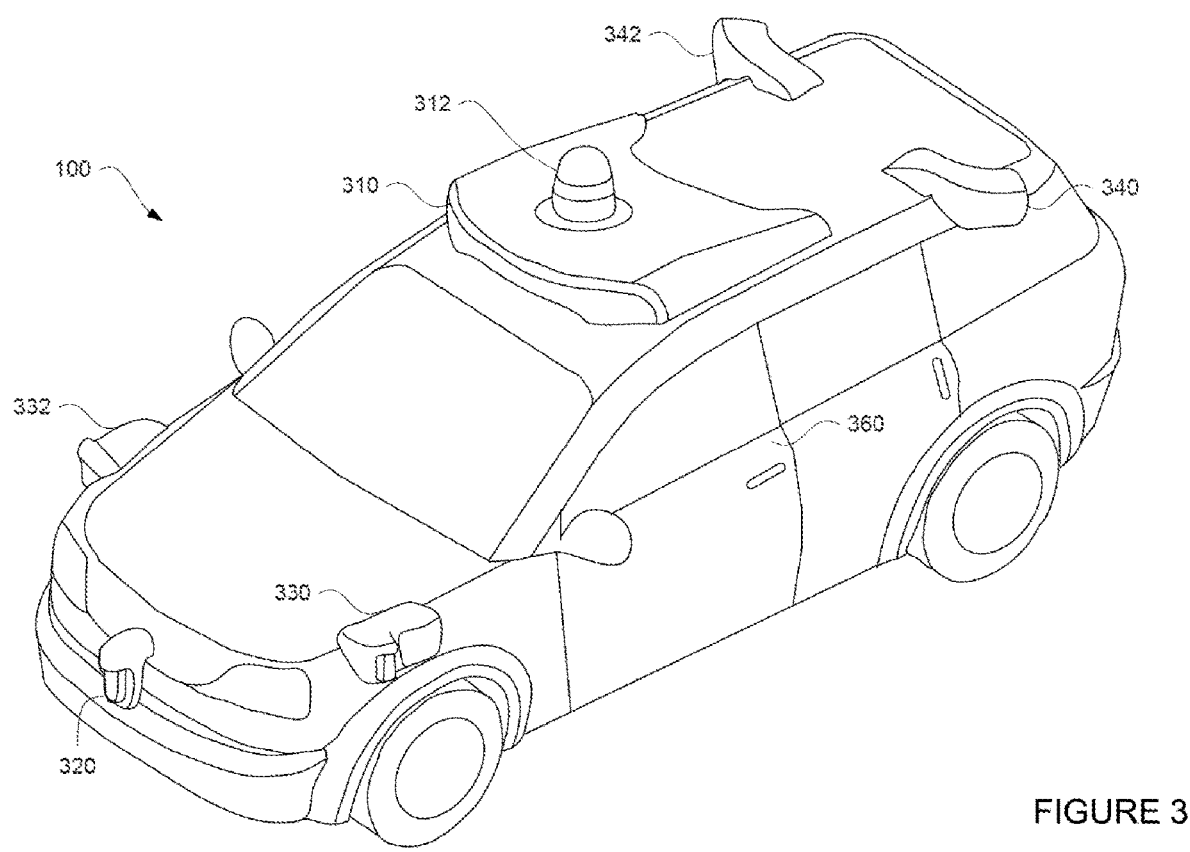
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

Memory 130 may also store predetermined rules that the computing devices 110 may use to determine how to respond to objects in the vehicle's environment and/or different situations. The rules may be configured as heuristics, decision trees, or other models but may define traffic precedence in certain situations. For instance, if a pedestrian is in a crosswalk, a rule may require that the vehicle must yield to the pedestrian, or if a traffic light signal associated with a particular lane at an intersection is red and the vehicle is in that lane, the vehicle must stop before proceeding through the intersection. These rules may be stored in the memory 130 and/or may be partially incorporated into the map information. For instance, each of stop signs 250, 252 may be associated with one or more rules indicating the lane or lanes from which the stop sign is to be obeyed, that obeying the stop sign means stopping within a certain distance of some location (such as intersection 204), the precedence of road users (vehicles, bicyclists, motorcyclists, etc.) stopping at intersection 204, and where to stop the vehicle. As another example, each of the traffic light signal lights 220, 222 may be associated with a rule indicating which lane is controlled by that traffic light signal light.

Based on these determinations, the computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
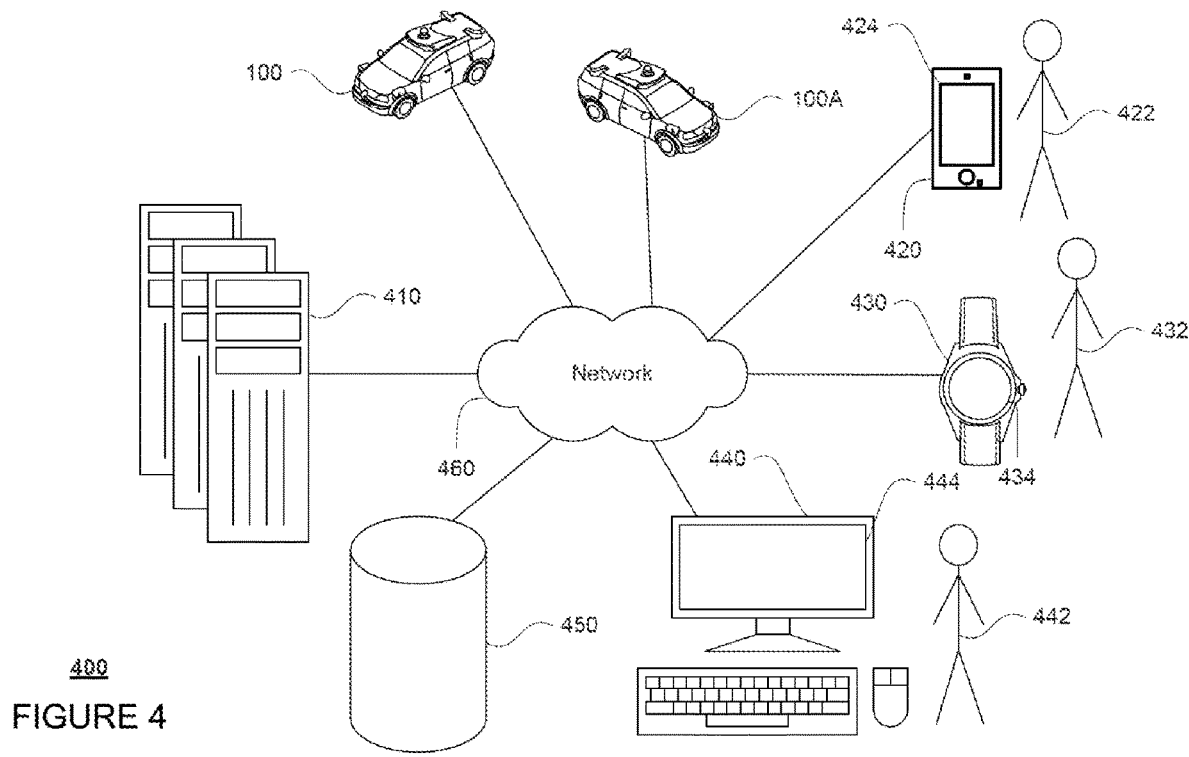
FIG. 4 is a pictorial diagram of an example system in accordance with aspects of the disclosure.
Figure 5:
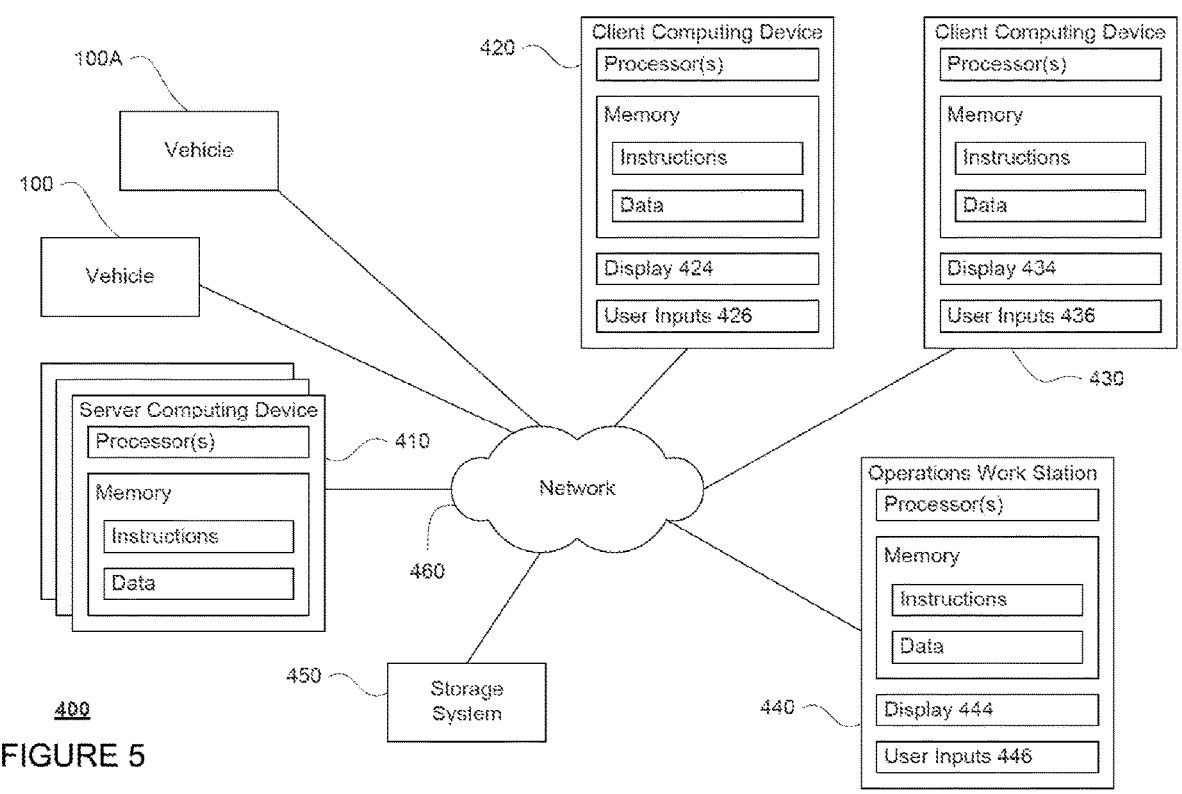
FIG. 5 is a functional diagram of the system of FIG. 4 in accordance with aspects of the disclosure.

Computing devices 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing devices 110 of vehicle 100 or a similar computing devices of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing devices 420, 430, 440 may be a personal computing devices intended for use by a user 422, 432, 442, and have all of the components normally used in connection with a personal computing devices including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing devices, they may alternatively comprise mobile computing devices capable of wirelessly exchanging data with a server over a network such as the Internet. By way of example only, client computing devices 420 may be a mobile phone or a device such as a wireless-enabled PDA, a tablet PC, a wearable computing devices or system, or a netbook that is capable of obtaining information via the Internet or other networks. In another example, client computing devices 430 may be a wearable computing system, shown as a wristwatch as shown in FIG. 4. As an example the user may input information using a small keyboard, a keypad, microphone, using visual signals with a camera, or a touch screen.

In some examples, client computing devices 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing devices, such as one or more server computing devices 410, in order to perform some or all of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing devices 110 may maneuver vehicle 100 to a destination location, for instance, to transport cargo and/or one or more passengers. In this regard, computing devices 110 may initiate the necessary systems to control the vehicle autonomously along a route to the destination location. For instance, the routing system 168 may use the map information of data 134 to determine a path or route to the destination location that follows a set of connected rails of map information 200. The computing devices 110 may then maneuver the vehicle autonomously (or in an autonomous driving mode) as described above along the route towards the destination.

Figure 6:
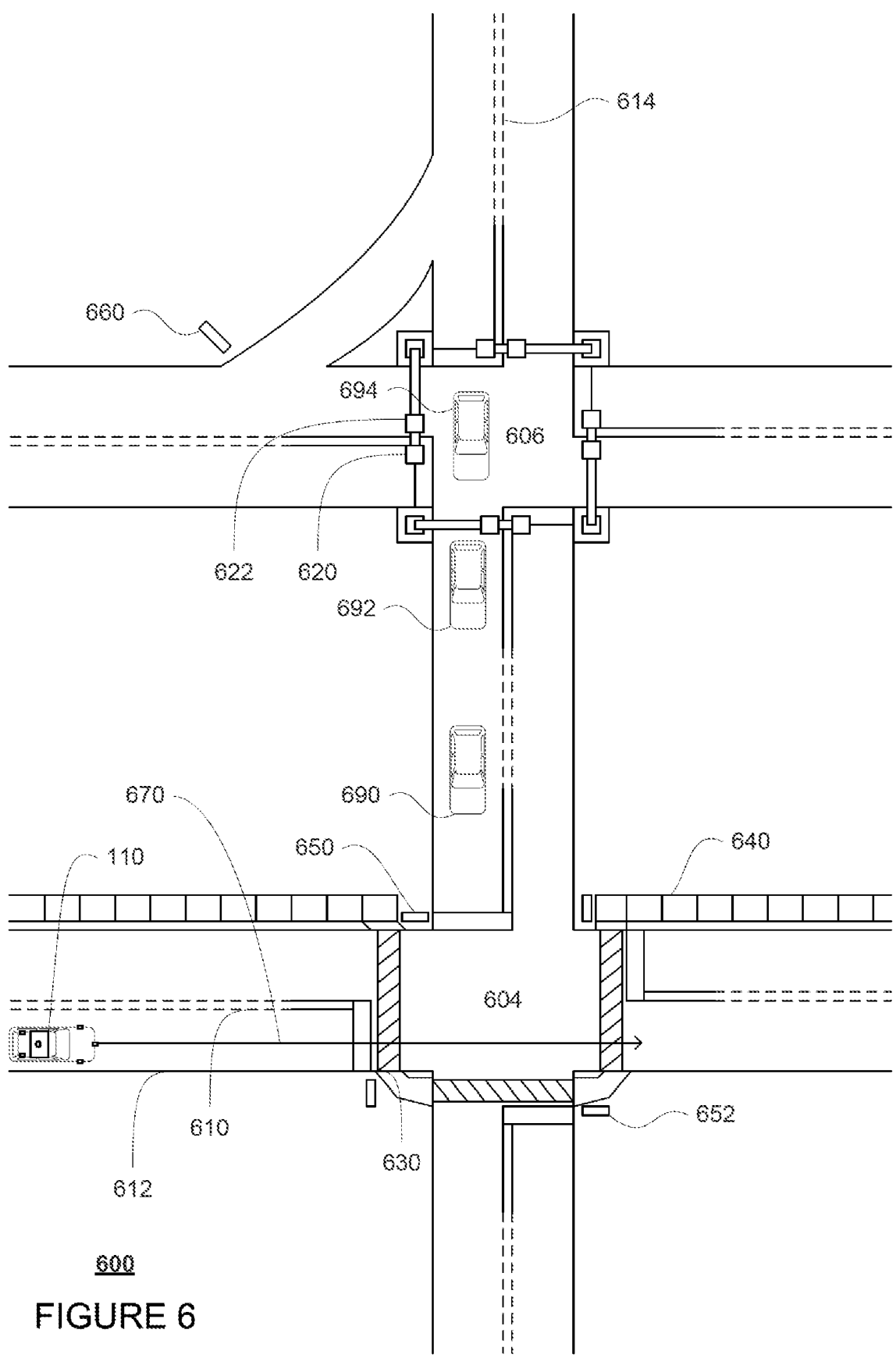
FIG. 6 is a view of a section of roadway in accordance with aspects of the disclosure.

For instance, FIG. 6 depicts vehicle 100 being maneuvered on a section of roadway 600 including intersections 602 and 604 corresponding to the map information 200. In this example, intersections 602 and 604 correspond to intersections 202 and 204 of the map information 200, respectively. In this example, lane lines 610, 612, and 614 correspond to the shape, location, and other characteristics of lane lines 210, 212, and 214, respectively. Similarly, crosswalk 630 corresponds to the shape, location, and other characteristics of crosswalk 230, respectively; sidewalks 640 correspond to sidewalks 240; traffic light signal lights 620, 622 correspond to traffic light signal lights 220, 222, respectively; stop signs 650, 652 correspond to stop signs 250, 252, respectively; and yield sign 660 corresponds to yield sign 260. In addition, various vehicles 690-494 are arranged at different locations around roadway 600.

As the vehicle 100 moves through its environment, the vehicle's perception system 172 may provide the computing devices with sensor data including information about the vehicle's environment. As noted above, this sensor data may include the sensor data may include the locations, orientations, heading, shapes, sizes, types of features of the map information as well as other objects. This information may be used to determine how to maneuver the vehicle based on a combination of this information, map data, as well as rules for responding to different situations.

Figure 7:
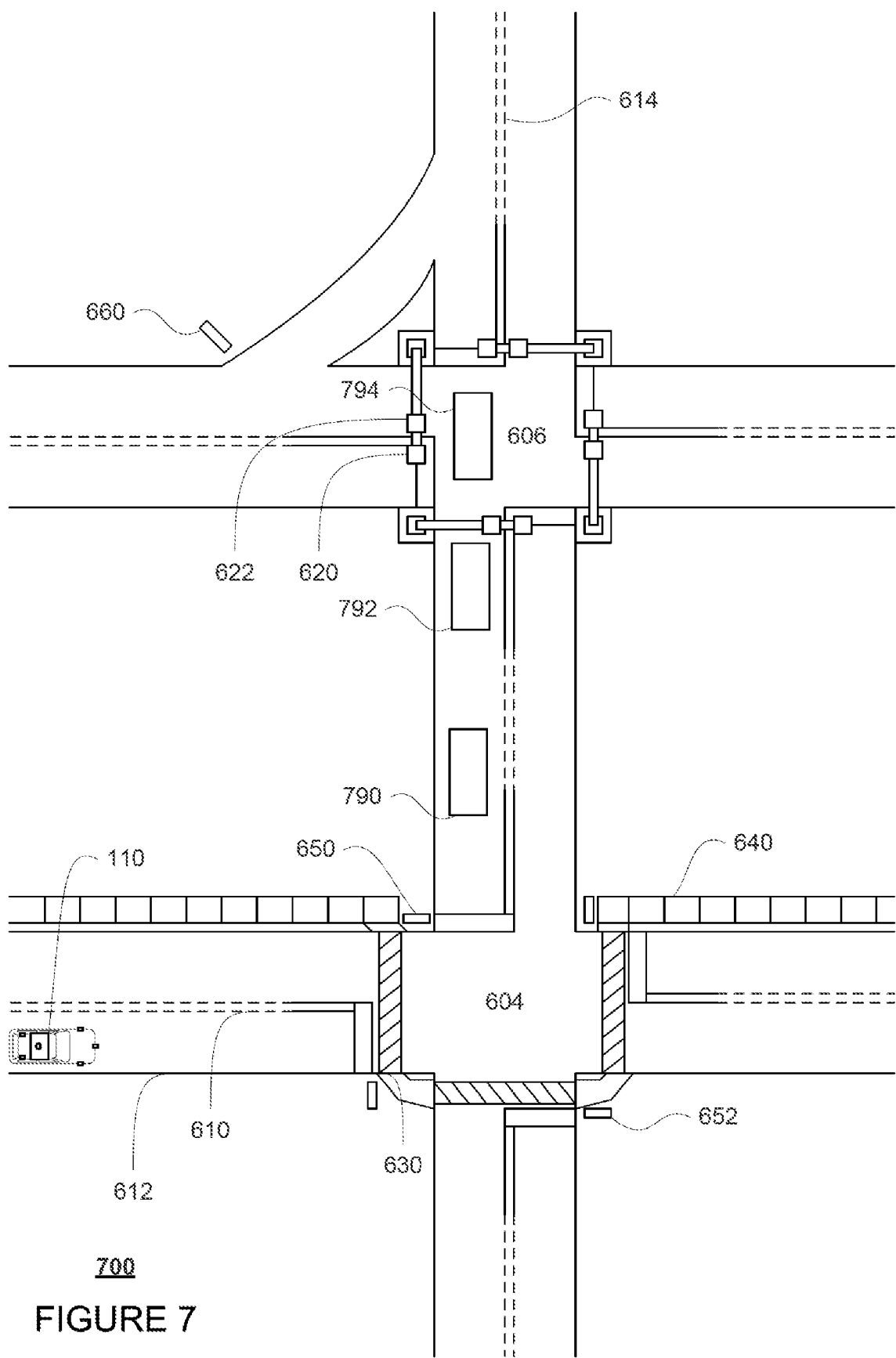
FIG. 7 is a view of a section of roadway and sensor data in accordance with aspects of the disclosure.

For instance, example 700 of FIG. 7 depicts features of the environment of vehicle 100 (as in the example 600 of FIG. 6) with bounding boxes for objects 790-794 representing the general shape and location of vehicles 690-694 as provided to the computing devices 110 by perception system 172. In this example, the routing system 168 use map information 200 to determine a route 670 for vehicle 100 to follow in order to reach a destination (not shown), and using this information and the rules of memory 130, the computing devices 110 may determine a trajectory for the vehicle to track over the next few seconds in order to follow the route.

Figure 8:
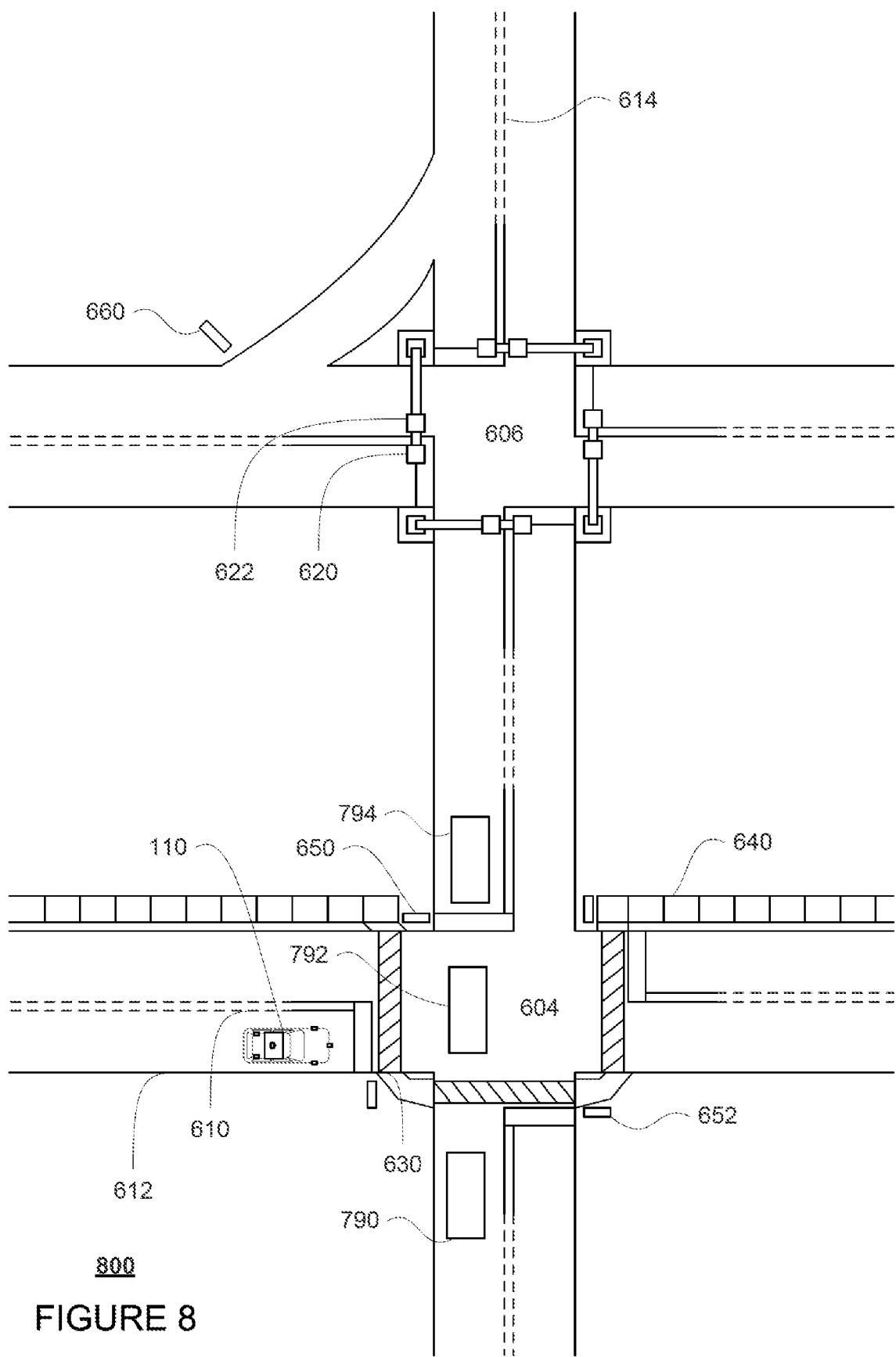
FIG. 8 is another view of a section of roadway and sensor data in accordance with aspects of the disclosure.

The sensor data may be tracked over time to determine the behavior of each object, for instance, how the object is moving through the world. For instance, example 800 of FIG. 8 depicts features of the environment of vehicle 100 at some point in time later than FIG. 7, such as a few seconds or more or less into the future. Again, the bounding boxes for objects 790-794 represent the general shape and location of vehicles 690-694 as provided to the computing devices 110 by perception system 172. By comparing the sensor data for such objects over time (for instance between FIGS. 7 and 8 and points between), the computing devices 110 may determine the behavior of these objects.

In order to detect a procession, the sensor data from the perception system 172 and the aforementioned determined behaviors may be analyzed to determine whether any detected objects are disobeying one of the rules (i.e. not following traffic precedence). Using this information, a procession detector, for instance a software module, of the instructions 132 of computing devices 110 may be used to detect whether the object is involved in a procession.

The detector may be run continuously, that is identifying an initial object as disobeying a rule may be part of the processing performed by the detector. Alternatively, the detector may be run in response to detecting one or more objects disobeying one of the rules. The procession detector may compare the observed behaviors to the rules in order to determine whether an object is obeying or disobeying a rule. For instance, each of bounding boxes 790, 792 may have been observed passing through intersection 204/604 without stopping for stop sign 250, 650. In addition, each of bounding boxes 792 and 794 may have been observed passing through intersection 202/602 without stopping for a red light at traffic light signal light 220.

The more objects that are observed disobeying the rules, and the more rules that are observed being disobeyed, the more likely that the object or objects are part of a procession, or rather, the greater the confidence in the determination that the object or objects are part of a procession. For instance, once a first object is observed passing through intersection 204/604 without stopping for stop sign 250/650 for each additional object observed passing through intersection 204/

604 without stopping for stop sign 250/650, this may make it more likely that each of those objects are part of a procession. Similarly, once a first object is observed passing through intersection 204/604 without stopping for a red light at traffic light signal light 220, for each additional object observed passing through intersection 204/604 without stopping for a red light at traffic light signal light 220, this may make it more likely that each of those objects are part of a procession. In addition, if some or all of the objects observed passing through intersection 204/604 without stopping for stop sign 250/650 are also observed passing through intersection 204/604 without stopping for a red light at traffic light signal light 220, this may make it more likely that each of these objects is part of a procession.

In one instance, the detector may determine whether there is a procession based on whether one or more thresholds is met. For instance, if a threshold minimum number of objects, such as 2 or more or less, are observed disobeying the same rule in the say way, such as all of these objects are passing through intersection 202/602 without stopping for a red light at traffic light signal light 220, the detector may determine that these objects are involved in a procession. Of course, the threshold minimum number need not be a fixed, whole number, but may actually be probabilistic in nature and derived from the sensor data collected from the perception system and logged in the memory 130. For another instance, if any number of objects appears to be consistently disobeying the same rule in the same way over a threshold minimum period of time, such as 10 seconds or more or less, the detector may determine that the objects are involved in a procession. For this example, the actual number of object sufficient to meet this threshold may depends on the nature of the 'rule violation' and other surrounding traffic. For instance, a vehicle that just barely runs a red light is not a strong signal, but an emergency vehicle that runs a well-established red light (or a traffic light that has been red for a second or longer) and then comes to a stop in the middle of an intersection may be enough of a signal on its own, and so on. For yet another instance, if a minimum number of objects is detected disobeying the same rule in the same way for some minimum period of time, this may indicate that the objects are involved in a procession.

In other instances, whether or there is a procession may be more nuanced. For instance, the likelihood may be a cumulative value that can increase or decrease based on a plurality of different signals and observations. In other words, the more vehicles observed disobeying a rule, the more confidence that the rule "is not in effect" for those vehicles. In addition, the more different rules being disobeyed by those observed vehicles, the more likely that there is some different set of rules in force because those objects are part of a procession. As an example, each additional object observed disobeying the same rule in the same way may increase a likelihood that the objects are involved in a procession by some value, such as 0.1 or more or less.

This value may be fixed or variable, for instance, increasing slightly for each additional object that is observed disobeying the same rule in the same way. For instance, for an initial observation, the value may be 0.1, but for each additional observation, the value may increase by 0.05, such that the second observation would be 0.15 (added to 0.1) and the third observation would be 0.2 (added to 0.25). In addition or alternatively, for each additional second or more or less of time that objects continue to disobey the same rule in the same way may also increase a likelihood that the objects are involved in a procession, such as 0.1 or more or less. In addition or alternatively, for each additional rule that those objects disobey in the same way may also increase a likelihood that the objects are involved in a procession, such as 0.1 or more or less. Similarly, in addition or alternatively, for each additional second or more or less of time that objects continue to disobey that additional rule in the same way may also increase a likelihood that the objects are involved in a procession, such as 0.1 or more or less. Again, value may be fixed or variable, for instance, increasing slightly for each additional object that is observed disobeying the same rule in the same way.

Other signals detected by the perception system 172 may further increase or the likelihood of a procession. For instance, if there is one or more emergency vehicles (such as a police car, firetruck, ambulance, or a police motorcycle) nearby, if a group of vehicles is being led by an emergency vehicle, if an emergency vehicle pulls into an intersection and stop, if a pedestrian (police or otherwise) is directing traffic, or if one or more motorcycles are stopping in an intersection (even without emergency lights or sirens), such signals may increase the likelihood of a procession, again by some fixed or variable amount. More complex situations, such as "leap-frogging" emergency or emergency vehicles doing things that typical vehicles would otherwise not do, may also be signals which may increase the likelihood of a procession, again by some fixed or variable amount. As an example, the aforementioned leap-frogging may be typical in processions which are being accompanied by police or other emergency vehicles which are temporarily stopping traffic to allow the procession to proceed. This may include a first emergency vehicle passing another, stopping (for instance at a first intersection to stop cross-traffic), which is by a second emergency vehicle which thereafter stops (for instance, to stop cross-traffic at a second intersection), and thereafter the first emergency vehicles proceeds to pass the second emergency vehicle and thereafter stop (for instance, to stop cross-traffic at a third intersection), and so on.

Visual signals captured, for instance, by one or more cameras of the perception system 172 may also be used to increase the likelihood of a procession, again by some fixed or variable amount. As an example, such visual signals may include those that would identify an object as a hearse (using a hearse detector), flags or window badges typically used in funeral processions and motorcades or on a lead vehicle of such processions, identifying pedestrians walking in a street with or without music playing, identifying pedestrians holding flags, signs or banners as well as the text on those, may also increase the likelihood of a procession.

Some signals detected by the perception system 172 may actually decrease the likelihood of a procession, again by some fixed or variable amount. If there are objects which do not appear to be disobeying the same rule in the same way, this may decrease or have no effect on the likelihood of a procession. Similarly, if there is a gap in time during which objects are obeying the rule, this may decrease the likelihood of a procession. In this case, the longer the gap, the greater the decrease in the likelihood of a procession. In some instances, local regulations may be taken into account by the detector. For instance, if funeral processions which disobey traffic lights or parades are forbidden in certain areas, this may decrease the likelihood of a procession.

Once this cumulative likelihood meets a certain threshold, the detector may determine that there is a procession. For instance, based on the observations of vehicles 690-694 by way of objects 790-794 and any other signals, the likelihood of a procession may be determined to be 80%. If the threshold is 75%, the detector may determine that there is a procession.

In some instances, the detector may even determine a type of the procession. For instance, if the procession involves pedestrians, this may indicate a parade or march. As another instance, if the procession involves a plurality of passenger vehicles, this may indicate a funeral procession or motorcade. At the same time, if the procession involves a plurality of motorcycles or pedestrians, this may indicate a parade. As yet another instance, if the procession includes vehicles with specific characteristics, for instance, vehicles marked with flags or text that indicate they are part of a funeral procession (as determined from images captured by a camera of the perception system), this may indicate a funeral procession.

Once the detector has determined that there is a procession, this information may be sent to the vehicle's planner and used in order to determine how to respond to the procession and therefore how to control the vehicle. For instance, there may be a default response to all processions to yield to the objects in a procession until the procession is over. In that regard, vehicle 100 may yield to all of objects 790-794 as these objects pass through intersection 202/602, even though the vehicle would otherwise have had the right of way to proceed through the intersection before one or more of the objects 790-794. In addition or alternatively, rather than a default response, certain types of behaviors, such as proceeding through an intersection where the vehicle 100 has the right of way, may no longer be an option when determining how to control the vehicle. In addition or alternatively, for certain types of processions, additional actions, such as requesting assistance or confirmation of a procession from a remote operator, such as by sending a request to operations workstation 440 via network 460, may also be taken.

In addition, the detector may identify the objects that are included in the procession, or rather, all of the objects that are disobeying the same rule in the same way. As such, these objects may be "grouped" together, or that is, responded to as a single object (even if they are tracked by the perception system separately). In this regard, if the determined response is to yield, the vehicle may be controlled to yield to all of the objects as a group. For instance, if all of objects 790-794, are determined to be part of a procession, the computing devices 110 may control the vehicle 100 to yield to all of these objects. This may keep the vehicle becoming aggressive or assertive inappropriately. As an example, if a funeral procession is passing through an intersection, the vehicle may have an opportunity to "cut into" the line in order to make a right turn because without the detector. This may be because the vehicle 100 may simply determine that the objects in the procession were merely slow moving traffic. Thus, by detecting a procession, the vehicle 100 would not move between the objects in a group of objects. As such this type of cut-in behavior, which is generally frowned upon and can be disconcerting to those in the procession, may be avoided.

Figure 9:
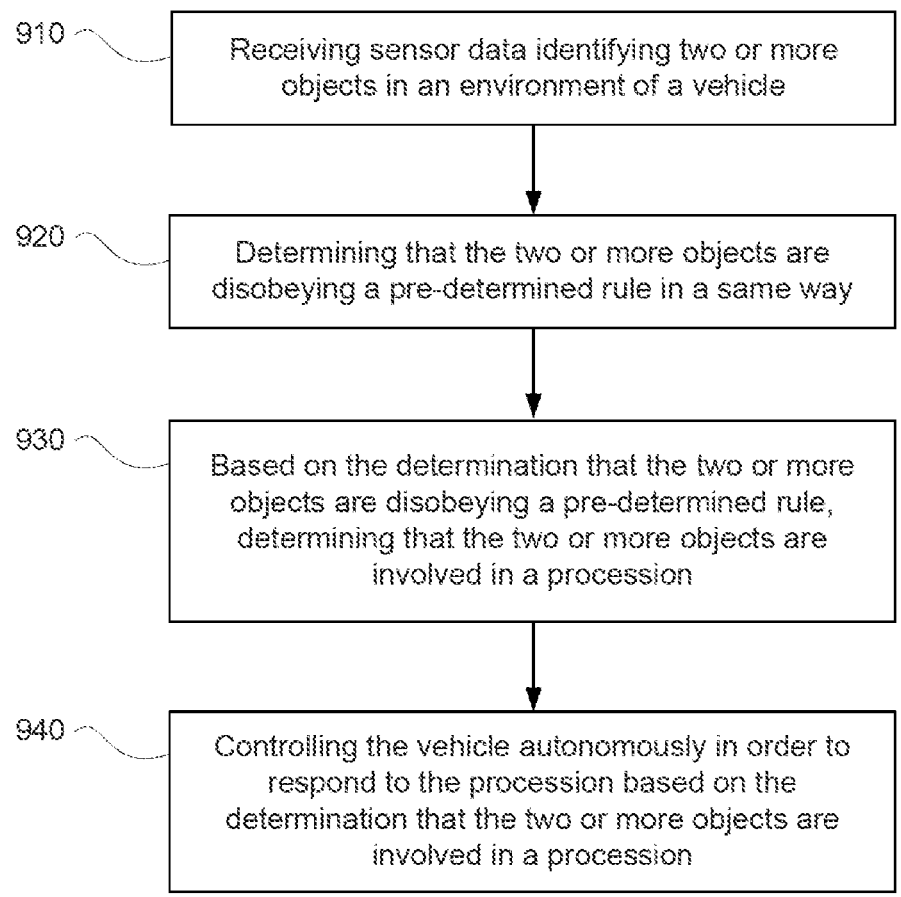
FIG. 9 is a flow diagram in accordance with aspects of the disclosure.

FIG. 9 is a flow diagram 900 that may be performed by one or more processors, such as one or more processors 120 of computing devices 110 in order to detect and respond to processions. For instance, at block 910, sensor data identifying two or more objects in an environment of a vehicle is received. At block 920, whether the two or more objects are disobeying a predetermined rule in a same way is determined. At block 930, based on the determination that the two or more objects are disobeying a predetermined rule, whether the two or more objects are involved in a procession is determined. At block 940, the vehicle is controlled autonomously in order to respond to the procession based on the determination that the two or more objects are involved in a procession.

The features described above provide for a useful way to detect and respond to procession. By doing so, the vehicle can respond to the procession, for instance yielding appropriately. This may keep the vehicle becoming aggressive or assertive inappropriately as well as preventing an uncomfortable stoppage of traffic by not appropriately responding, for instance not yielding or cutting into, to processions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle autonomously, the method comprising:
  receiving, by one or more processors, sensor data;
  determining, by the one or more processors based on the sensor data, a number of objects that pass through an intersection without stopping for a red light of a traffic light signal light located at the intersection; and
  controlling, by the one or more processors, the vehicle autonomously based on the determined number of objects.

2. The method of claim 1, wherein the sensor data identifies two or more objects in an environment of the vehicle, the objects being vehicles other than the vehicle.

3. The method of claim 1, wherein the greater the number of objects, the more likely that each of the objects is part of a procession.

4. The method of claim 3, further comprising:
  determining, by the one or more processors based on the sensor data, a cumulative value associated with a likelihood that the number of objects are part of a procession.

5. The method of claim 4, wherein the cumulative value increases as the number of objects increases.

6. The method of claim 1, further comprising:
  determining, by the one or more processors based on the sensor data, whether the number of objects meets one or more thresholds.

7. The method of claim 6, wherein the one or more thresholds includes a threshold minimum number of objects.

8. The method of claim 7, wherein the threshold minimum number of objects is two.

9. The method of claim 1, wherein the number of objects are determined over a threshold minimum period of time.

10. A method of controlling a vehicle autonomously, the method comprising:
  receiving, by one or more processors, sensor data;
  determining, by the one or more processors based on the sensor data, a number of objects that pass through an intersection without stopping for a stop sign located at the intersection; and controlling, by the one or more processors, the vehicle autonomously based on the determined number of objects.

11. The method of claim 10, wherein the sensor data identifies two or more objects in an environment of the vehicle, the objects being vehicles other than the vehicle.

12. The method of claim 10, wherein the greater the number of objects, the more likely that each of the objects is part of a procession.

13. The method of claim 12, further comprising:
determining, by the one or more processors based on the sensor data, a cumulative value associated with a likelihood that the number of objects are part of a procession.

14. The method of claim 13, wherein the cumulative value increases as the number of objects increases.

15. The method of claim 10, further comprising:
determining, by the one or more processors based on the sensor data, whether the number of objects meets one or more thresholds.

16. The method of claim 15, wherein the one or more thresholds includes a threshold minimum number of objects.

17. The method of claim 16, wherein the threshold minimum number of objects is two.

18. The method of claim 10, wherein the number of objects are determined over a threshold minimum period of time.

19. A method of controlling a vehicle autonomously, the method comprising:
receiving, by one or more processors, sensor data;
determining, by the one or more processors based on the sensor data, a number of objects that pass through an intersection without stopping for a red light of a traffic light signal light or a stop sign located at the intersection;
determining, by the one or more processors based on the number of objects, whether the objects are likely to be part of a procession; and
when the objects are determined to be part of the procession, controlling, by the one or more processors, the vehicle autonomously to yield to the objects.

20. The method of claim 19, wherein the number of objects are determined over a threshold minimum period of time.

* * * * *